V. P. McVOY.
HOSE COUPLING.
APPLICATION FILED FEB. 6, 1909.
939,436.
Patented Nov. 9, 1909.
2 SHEETS—SHEET 1.
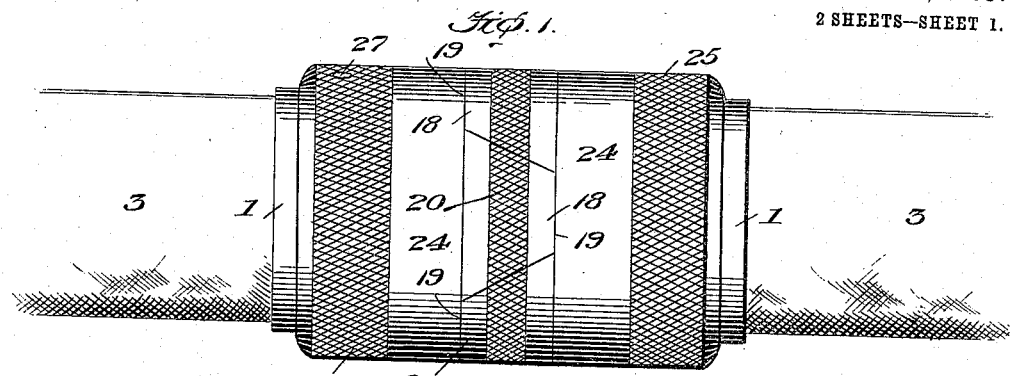
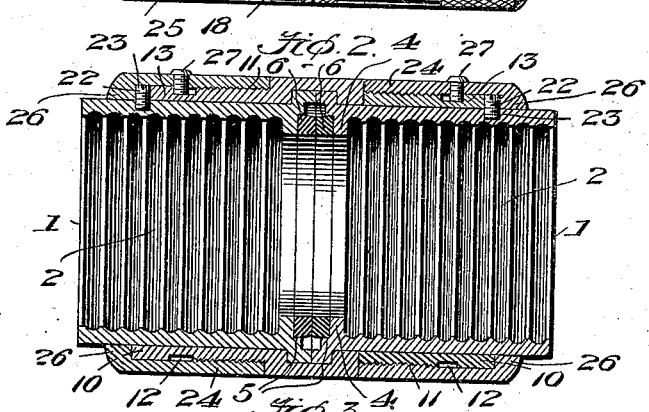
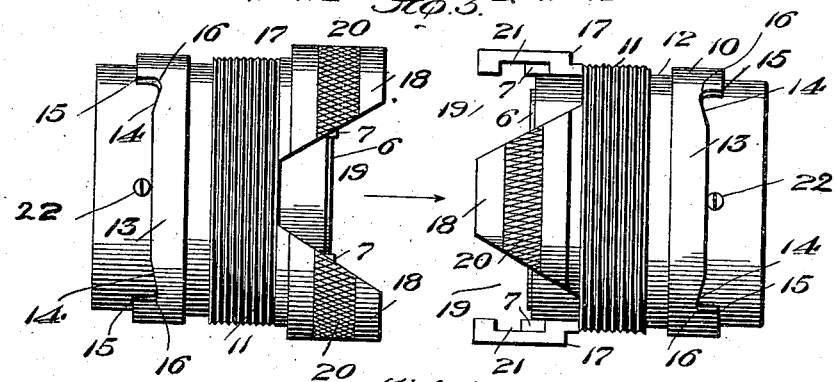
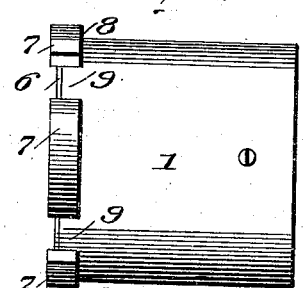
Witnesses
Inventor
Vincen P. McVoy
By E. H. Bond
Attorney

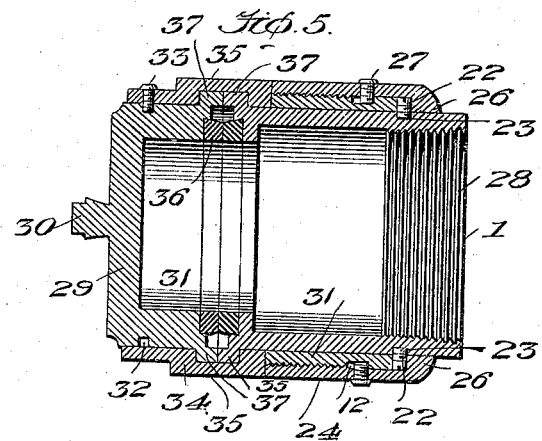
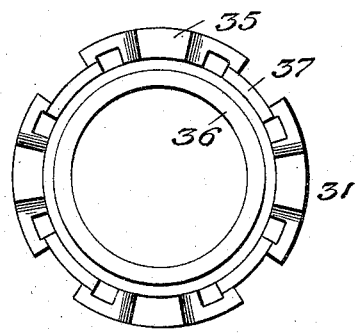
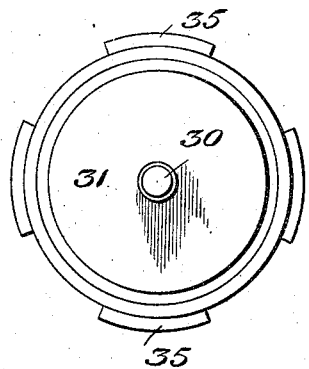

UNITED STATES PATENT OFFICE.

VINCEN P. McVOY, OF MOBILE, ALABAMA.

HOSE-COUPLING.

939,436.  Specification of Letters Patent.  Patented Nov. 9, 1909.

Application filed February 6, 1909. Serial No. 476,376.

*To all whom it may concern:*

Be it known that I, VINCEN P. McVOY, a citizen of the United States of America, and resident of Mobile, in the county of Mobile and State of Alabama, have invented certain new and useful Improvements in Hose-Couplings, of which the following is a specification.

This invention relates to couplings for hose of that class known as quick-acting, and it has for its objects among others to provide a simple and improved form of hose coupling in which the opposing members are provided with projecting portions adapted to interengage and with interlocking lugs confined within said interengaging members, and a tightening and locking ring constructed to draw said members together and to lock them against accidental movement.

It has for a further object to provide a coupling having supplemental means for tightening the parts after they have been tightened by the one sleeve or ring and also to provide against movement in either direction of the intermediate rotatable members after they have been drawn tightly together by the tightening and locking rings.

A further object is to provide a construction applicable for use with a cap or plug as upon a hydrant.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation showing two sections of hose united by my improved coupling. Fig. 2 is a substantially central longitudinal section through the coupling with the parts in closed position. Fig. 3 is a side elevation of the two interlocking members of the coupling. Fig. 4 is a side elevation of the inner member of one of the elements seen in Fig. 3 removed. Fig. 5 is a substantially central longitudinal section showing the application of the invention to a hydrant and plug. Fig. 6 is an end elevation of one of the halves of the coupling seen in Fig. 3, looking in the direction of the arrow in the latter figure. Fig. 7 is a view looking at the inner end of the cap seen in Fig. 5.

Like numerals of reference indicate like parts in the several views.

Referring to the drawings, 1 designates the inner or main member of one half of the coupling. It is corrugated interiorly, as shown at 2 in Fig. 2, for the attachment of the hose 3 in the manner well known in the art. At its inner end it is provided with the annular internal shoulder 4 and with a socket 5 to receive a packing ring or gasket 6, all as clearly illustrated in Fig. 2. As seen in Fig. 4, the inner end of this member is formed with flanges 7 which extend outward beyond the periphery thereof, forming shoulders 8, and also in the direction of the length of said member beyond the end thereof, as seen clearly in said Fig. 4. These flanges are spaced with an opening 9 between the adjacent ends of each two flanges. The wall of the gasket-receiving socket may be undercut, as shown clearly in Fig. 2, so that the gasket may be held firmly therein by frictional engagement within the socket, supplemented by cement or other adhesive material, if found desirable. As the two opposed members of the coupling, as shown in Figs. 1 to 4, are exact duplicates of each other, a detailed description of but one is necessary for a complete understanding of the construction and the mode of assembling.

10 is the member embracing the member 1. It is formed between its ends with an exteriorly threaded portion 11 and adjacent the same with an annular groove 12, beyond which, toward its outer end, is the annular portion 13 having a cut away portion 14, the ends of which form shoulders 15, and adjacent said shoulders at the ends of the cut away portion are formed depressions 16 communicating with the cut away portion for a purpose which will soon be explained. At the opposite end, the member 10 is formed with a shoulder 17 and with alternated tapered projections 18 and recesses 19, the projections of the one half of the coupling being adapted to engage in the recesses between the projections of the opposing half, as will be clearly understood upon reference to Fig. 3. The outer periphery of the projections 18 is milled or roughened, as seen at 20, for an obvious purpose.

The projections 18 are recessed upon their inner faces, as seen at 21 in Fig. 3, and these recesses are of sufficient width or extent in the direction of the length of the projections to receive two of the flanges 7 on the abutting members 1 when the parts are assembled, with the flanges 7 interlocked or engaged past each other, but of less width than the combined width of the two opposing flanges 7 so that, when said flanges are in alinement or directly opposed to each other, the said flanges will not be received within the recesses of the projections 18, so that, when the parts are locked, the two members cannot have relative rotary motion, nor can they be disengaged endwise.

After the member 10 has been placed in position upon the member 1, a screw or the like 22 is engaged in an opening 23 in the end of the member 1, as seen clearly in Fig. 3, so as to engage the inner wall of the cut away portion 14, as seen in Fig. 3, so that endwise movement of the member 12 upon the member 1 is prevented except when the parts are in such position that the screw or analogous device 22 is opposite one or the other of the depressions 16, when slight endwise movement of the member 12 is permitted, for the purpose of allowing requisite endwise movement of said member 12 to render more effective the locking of the parts.

24 is a tightening ring interiorly threaded and engaging the threads 11 of the member 10, being milled or roughened exteriorly, as shown at 25, for an obvious purpose, and at one end provided with an inwardly extending flange 26, as seen clearly in Fig. 2. This inwardly projecting flange covers the stop member 22 and serves to prevent ingress of dust and dirt thereto and to the groove or cut away portion in which it works. After the ring 24 is placed in position, a screw or the like 27 is engaged in a suitable opening therein, the inner end projecting a sufficient distance to travel in the groove 12 in the member 10, as clearly illustrated in Fig. 2, to limit endwise displacement of the tightening ring 24. This groove, however, is of greater width than the diameter of the screw 27, so as to allow of the requisite endwise movement of the ring 24 upon the member 10.

Figs. 1 and 2 show the duplication of the parts and the manner in which they are interlocked and the interlocked parts tightened in such position.

The two portions of the coupling being constructed and the parts thereof assembled, as hereinbefore described, the mode of use will be apparent from the accompanying drawings, when taken in connection with the foregoing description, and, briefly stated, is as follows:—In order to get the parts into engaging position, they must be turned so that the lugs or flanges 7 of the members 1 are in alinement with the projections 18 of the members 10. The two halves of the coupling are then brought toward each other until the projections 18 thereof engage in the recesses 19. The opposed flanges 7 of the members 1 then project slightly past each other so that their adjacent ends prevent rotary movement thereof. Then either one of the members 10 is turned to the right or left a sufficient distance for the grooves or recesses 21 thereof to receive the opposed flanges or lugs 7, such movement being limited by the engagement of the stop member 22 with one or the other of the shoulders 15 on the flange 13 of the member 10. This brings the two opposing gaskets face to face abutting each other, as seen clearly in Fig. 2. Now by turning either one of the rings 24, the member 10 with which it coacts is given a slight endwise movement so that its forward end engages and presses against the end of the projections 18 of the opposing member, so as to firmly lock the parts in position, the stop member 22 entering the depression 16 and thus the member 10 is held against rotary movement in either direction. It is to be noted that either ring 24 may be rotated independently of the other and also that rotation of either ring serves to tighten and lock the parts in position. After thus tightened, however, the other ring may be turned up in order to reinforce the tightening effected by the other ring. It is to be noted that, as the tightening ring is turned, it draws upon the one member and pushes upon the opposing one, so that a tight joint is effected with slight movement of the ring on the opposing members. The one tightening ring will thus move both of the members 10 so as to effect the tightening and insuring a tight joint as well as locking the parts on both ends. To uncouple, all that is necessary is to loosen the tightening rings, or only one, should but one have been screwed up, and then a slight turn of either of the members 10 so as to disengage the grooves or recesses 21 of the projections 18 from the opposed lugs or flanges 7, and then the parts are free to be separated by endwise movement from each other.

While I have shown and hereinbefore described the members as provided with four lugs and projections, it is evident that this number may be varied and hence I do not wish to be restricted to any exact number.

In Fig. 5 I have shown the application of the invention to a hydrant, the same principles, however, being involved as in the coupling above described, the only difference being as follows:—The member 1 is interiorly threaded, as at 28, to engage the plug or other screw connection to which it may be desired to apply it. In other respects, the member applied to the plug is in all respects the same as one-half of the coupling described in connection with Figs. 1 to 4. Instead, however, of employing in connection therewith a similar member, I employ a cap 29 which is shown as provided with a stem 30, for a purpose well known in the art. This cap comprises the two members 31 which is provided with a continuous exterior groove 32, for the reception of a screw, pin or the like 33 on the member 34. The member 34 is provided with the projections 35 to correspond in number with those of the member fixed on the plug, it being understood that these projections are tapered, as are those in Fig. 3, as shown clearly in Fig. 6, the gasket 36 being held within an annular socket or groove in the inner end of the cap, as seen in Figs. 5 and 6. The member 31 is provided with lugs 37 corresponding to the lugs 7 of the coupling member seen in Fig. 3 and for a like purpose. In use, it is to be understood that the cap member is applied to the fixed member of the plug or hydrant in exactly the same manner as the coöperating coupling member in the coupling shown in Fig. 3, except that the outer member 34 is free to revolve, not being limited in its rotation as is the tightening ring in the form shown in Figs. 1 to 4, it being understood that a tightening sleeve on the cap member is not necessary, the requisite tightening being accomplished by means of the tightening ring 24 on the member affixed to the plug or hydrant, the screwing up of which serves to draw together and tighten the two members having the tapered projections.

Modifications in detail may be resorted to without departing from the spirit of the invention or sacrificing any of its advantages.

What is claimed as new is:—

1. In a hose coupling, a coupling section comprising an inner member with spaced lugs, a member loosely mounted thereon for limited rotation and having an exterior annular groove and an annular portion beyond the same with stop shoulders and having tapered projections with grooves upon their inner faces, means engageable with said shoulders for limiting the endwise movement of said member, and a tightening ring having engagement with said member and limited in its axial movement.

2. In a hose coupling, a coupling section comprising an inner member with spaced lugs, a member loosely mounted thereon for limited rotation and having an annular groove and an annular portion beyond the same with stop shoulders and having tapered projections with grooves upon their inner faces, means engageable with said shoulders for limiting the endwise movement of said member, and a tightening ring having engagement with said member and limited in its axial movement and having an inwardly extended flange covering the means which limits the endwise movement of the intermediate member.

3. In a hose coupling, a coupling section comprising a body portion with spaced lugs extending radially and endwise beyond the body of the member, a sleeve loosely embracing said member and having tapered lugs with inner grooves at one end and a cut away portion at the other with depressions at the end of said cut away portion, a stop member in the body portion, and a tightening ring rotatably mounted on the intermediate member and having limited endwise displacement.

4. In a hose coupling, interengaging sections, each comprising a body portion with spaced lugs, a sleeve embracing the same and having tapered projections with grooves upon their inner faces, means limiting the endwise displacement of said sleeve on the body portion and a tightening ring having threaded engagement with said sleeve engageable with the projections of an opposing member and having limited endwise displacement.

5. In a hose coupling, interengaging sections, each comprising a body portion with spaced lugs, a sleeve embracing the same and having tapered projections with grooves upon their inner faces, means limiting the endwise displacement of said sleeve on the body portion, and a tightening ring having threaded engagement with said sleeve engageable with the projections of an opposing member and having limited endwise displacement, said sleeve having a cut away portion and depressions near the ends of said cutaway portion, and means on the body portion engageable in said cutaway portion and depressions to limit the endwise displacement of the sleeve.

6. In a hose coupling, interengaging sections, each comprising a body portion with spaced lugs, a sleeve embracing the same and having tapered projections with grooves upon their inner faces, means limiting the enwise displacement of said sleeve on the body portion and a tightening ring having threaded engagement with said sleeve engageable with the projections of an opposing member and having limited endwise displacement and engageable with the end of the projections of the opposing section, each section having a socket at its inner end, and a gasket seated in said socket.

7. In a hose coupling, two opposed interengaging sections, each formed of members having limited endwise movement upon each other, one of said members having a plurality of spaced lugs and another member having a plurality of tapered projections with grooves for coöperation with said lugs and each section having a tightening ring constructed to contact with the ends of the projections of the opposing section and force the members having the tapered projections in opposite directions.

8. In a hose coupling, two opposed sections, each comprising a body portion having at one end spaced lugs projecting peripherally and endwise beyond the body portion, a sleeve rotatably mounted on the body portion and having at one end tapered lugs with grooves upon their inner faces and at the other end with a cut away portion, a stop member in the body portion disposed in the cut away portion of the sleeve, and a tightening ring having threaded engagement with said sleeve and having limited endwise movement thereon to contact with the ends of the projections of the opposing section and force the sleeves in opposite directions as it is screwed up.

9. In a hose coupling, two opposed sections, each comprising a body portion with spaced lugs extending peripherally and endwise beyond the body portion, a sleeve slidably mounted on the body portion and having exterior threads and tapered projections with grooves upon their inner faces, means for limiting endwise displacement of said sleeve, and a tightening ring engaging the threads of the sleeve and directly engageable with the ends of the projections of the opposed section, the lugs of the opposed body members being constructed to be interspaced.

10. In a hose coupling, two opposed sections, each comprising a body portion with spaced lugs extending peripherally and endwise beyond the body portion, a sleeve slidably mounted on the body portion and having exterior threads and tapered projections with grooves upon their inner faces, means for limiting the endwise displacement of said sleeve, and a tightening ring engaging the threads of the sleeve, the lugs of the opposed body members being constructed to be interspaced, and the grooves of the projections being of less width than the combined widths of the two opposed lugs.

Signed by me at Washington, D. C. this 4th day of February 1909.

VINCEN P. McVOY.

Witnesses:
 ROBERT A. BOSWELL,
 E. H. BOND.